US011579518B2

(12) United States Patent
Maeda

(10) Patent No.: US 11,579,518 B2
(45) Date of Patent: Feb. 14, 2023

(54) LIGHT SOURCE DEVICE AND IMAGE PROJECTION APPARATUS INCLUDING THE SAME

(71) Applicant: CANON KABUSHIKI KAISHA, Tokyo (JP)

(72) Inventor: Yuuki Maeda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/512,417

(22) Filed: Oct. 27, 2021

(65) Prior Publication Data

US 2022/0146919 A1    May 12, 2022

(30) Foreign Application Priority Data

Nov. 6, 2020   (JP) .............................. JP2020-186026

(51) Int. Cl.
*G03B 21/20*    (2006.01)

(52) U.S. Cl.
CPC ....... *G03B 21/204* (2013.01); *G03B 21/2013* (2013.01); *G03B 21/2066* (2013.01)

(58) Field of Classification Search
None
See application file for complete search history.

(56) References Cited

U.S. PATENT DOCUMENTS

2021/0063855 A1*   3/2021   Umamine .......... G03B 21/2073

FOREIGN PATENT DOCUMENTS

| JP | 6507828 B2 | 5/2019 |
| JP | 2019160624 A | 9/2019 |
| WO | 2012066654 A1 | 5/2012 |
| WO | 2012127554 A1 | 9/2012 |

* cited by examiner

*Primary Examiner* — Bao-Luan Q Le
*Assistant Examiner* — Danell L Owens
(74) *Attorney, Agent, or Firm* — Canon U.S.A., Inc. IP Division

(57) ABSTRACT

A device includes a light source configured to generate first light, an optical element configured to reflect light incident on the optical element at a first angle of incidence and transmit light incident on the optical element at a second angle of incidence smaller than the first angle of incidence, a first reflecting unit, a second reflecting unit, and a conversion unit on which the first light is incident and which is configured to emit second light, wherein the first light is reflected by the first reflecting unit, passes through the optical element, and is then incident on the second reflecting unit, and wherein the second reflecting unit reflects the first light to the conversion unit.

20 Claims, 7 Drawing Sheets

LIGHT SOURCE DEVICE AND IMAGE PROJECTION APPARATUS INCLUDING THE SAME

BACKGROUND OF THE DISCLOSURE

Field of the Disclosure

The aspect of the embodiments relates to a light source device and an image projection apparatus including the same.

Description of the Related Art

In recent years, a light source device is developed that makes laser light incident as excitation light on a phosphor and uses fluorescent light generated from the phosphor as illuminating light. Japanese Patent Application Laid-Open No. 2019-160624 and Japanese Patent No. 6507828 discuss a light source device that makes laser light incident on a phosphor in which a cooling member is installed, from the opposite side of the side where the cooling member is installed, and uses generated fluorescent light as illuminating light.

In the light source device discussed in Japanese Patent Application Laid-Open No. 2019-160624, the laser light is incident from a gap between a condenser lens and the phosphor, and therefore, the distance between the condenser lens and the phosphor needs to be increased to some extent. In this case, a high angle component of fluorescent light generated from the phosphor cannot be obtained. This decreases the light collection efficiency of the condenser lens. Further, the laser light is incident from the gap between the condenser lens and the phosphor at a large angle of incidence, and therefore, a light collection spot distorts. This decreases the light emission efficiency of fluorescent light and the light use efficiency of a subsequent optical system.

In the light source device discussed in Japanese Patent No. 6507828, the light collection efficiency is secured by reducing the distance between a light collection optical system and the phosphor, while the light collection efficiency is improved by emitting the laser light from a through hole formed in a light collection optical system. In the light source device discussed in Japanese Patent No. 6507828, however, fluorescent light collected by the light collection optical system is scattered by the through hole. Thus, the amount of light to be ultimately extracted from the light collection optical system cannot be increased.

SUMMARY OF THE DISCLOSURE

According to an aspect of the embodiments, a device includes a light source configured to generate first light, an optical element configured to reflect light incident on the optical element at a first angle of incidence and transmit light incident on the optical element at a second angle of incidence smaller than the first angle of incidence, a first reflecting unit, a second reflecting unit, and a conversion unit on which the first light is incident and which is configured to emit second light, wherein the first light is reflected by the first reflecting unit, passes through the optical element, and is then incident on the second reflecting unit, and wherein the second reflecting unit reflects the first light to the conversion unit.

Further features of the disclosure will become apparent from the following description of exemplary embodiments with reference to the attached drawings.

DESCRIPTION OF THE EMBODIMENTS

Figure 1:
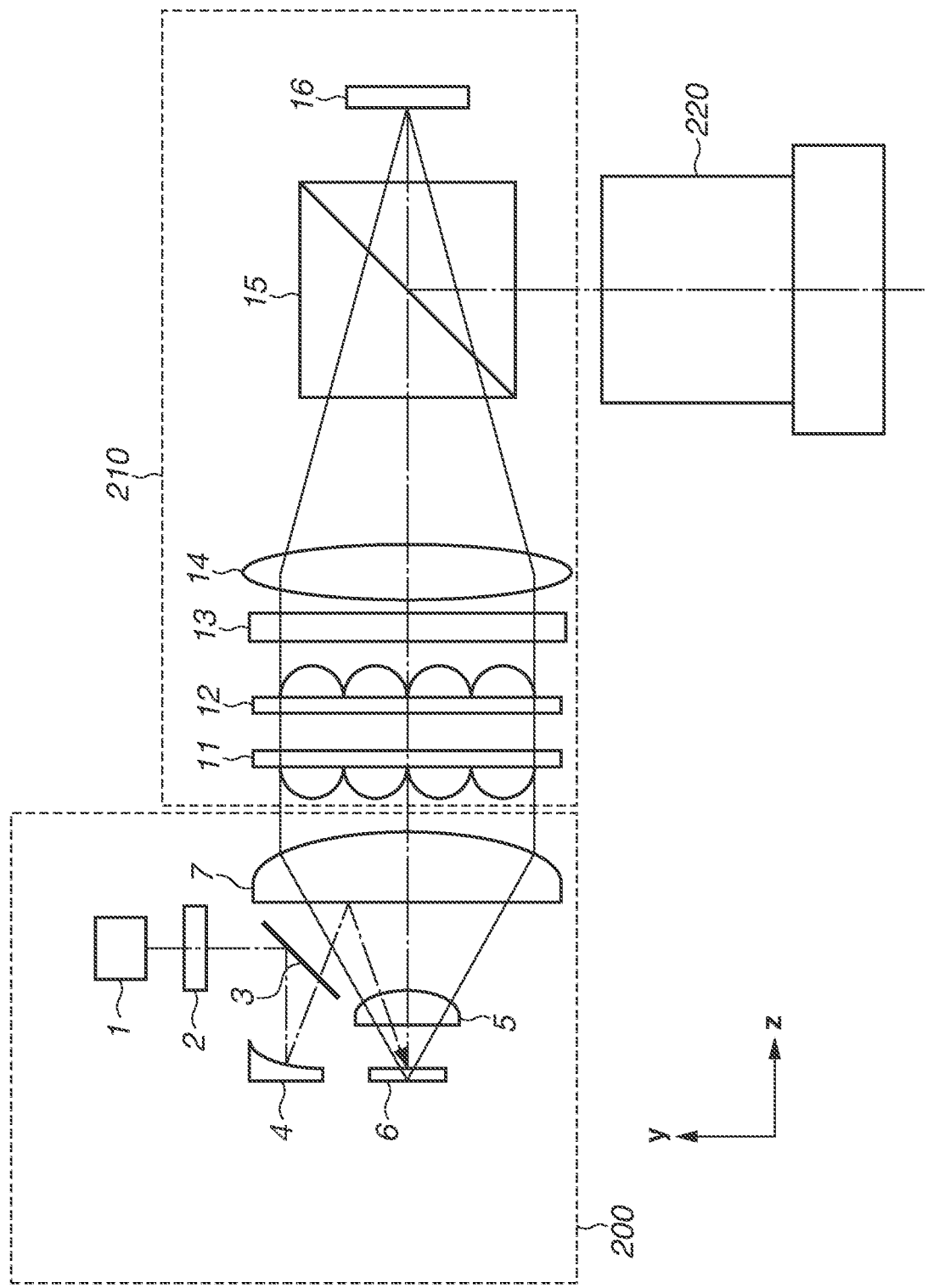
FIG. 1 is a diagram illustrating a configuration of an image projection apparatus according to a first exemplary embodiment of the disclosure.

Exemplary embodiments of the disclosure will be described in detail below based on the attached drawings. In the drawings, the same members are designated by the same reference numbers, and are not redundantly described.

FIG. 1 is a diagram illustrating the configuration of an image projection apparatus according to a first exemplary embodiment. The image projection apparatus includes a light source device 200, an illumination optical system 210, and a projection lens 220.

In the light source device 200, an optical system includes a laser diode (LD) unit 1, a micro fly's-eye lens 2, a dichroic mirror 3, a concave mirror 4, a first collimator lens 5 (a first lens), a phosphor unit 6, and a second collimator lens 7 (a second lens).

The LD unit 1 (a light source) includes a plurality of LDs and a plurality of collimator lenses and emits blue light (first light). The LD unit 1 is a light source that generates the first light. The blue light emitted from the LD unit 1 passes through the micro fly's-eye lens 2, is reflected by the dichroic mirror 3, is reflected by the concave mirror 4, passes through the dichroic mirror 3, and is reflected by the second collimator lens 7. The light reflected by the second collimator lens 7 passes through the first collimator lens 5 and is collected on the phosphor unit 6. On the phosphor unit 6, a predetermined rectangular image is formed by the optical action of the micro fly's-eye lens 2, the concave mirror 4, and the first collimator lens 5. The LD unit 1 may include not a laser light source, but a light-emitting diode (LED) or a mercury lamp.

The phosphor unit 6 (a wavelength conversion unit) is an element obtained by applying a phosphor layer to a substrate. Between the substrate and the phosphor layer, a reflective film that reflects fluorescent light is vapor-deposited. That is, the phosphor unit 6 is a wavelength conversion element that converts at least a part of the blue light emitted from the LD unit 1 into fluorescent light (second light) having a wavelength range different from that of the blue light. As the substrate, a metal plate having high thermal conductivity, such as an aluminum or copper plate, may be used, or a transparent substrate having high thermal conductivity, such as a sapphire substrate, may be used. The phosphor unit 6 is not limited to a fixed method, and may have a configuration in which a motor for rotating the phosphor unit 6 is placed. The wavelength conversion unit is not limited to a phosphor, and a quantum rod may be used.

The dichroic mirror 3 (an optical element) is an optical element having the property of reflecting the blue light at a first angle of incidence and transmitting the blue light at a second angle of incidence. In the present exemplary embodiment, the range of the first angle of incidence is from 40 degrees to 50 degrees, and the range of the second angle of incidence is from 0 degrees to 25 degrees. An angle of incidence indicates the angle of a ray to a normal to the surface of the dichroic mirror 3 on which a dichroic film is vapor-deposited. The second collimator lens 7 has a region on which a dichroic film (a second reflecting unit) having the property of reflecting the blue light and transmitting the fluorescent light is vapor-deposited.

The fluorescent light emitted from the phosphor unit 6 is parallelized by the first collimator lens 5 and the second collimator lens 7 and is incident on the illumination optical system 210. The fluorescent light incident on the illumination optical system 210 passes through an integrator system including a first fly's-eye lens 11 and a second fly's-eye lens 12 and a condenser lens 14 and illuminates a liquid crystal panel 16 that is an image display element. The fluorescent light having passed through the integrator system is converted into P-polarized light by a P-S conversion element 13, and the P-polarized light passes through a polarizing beam splitter (PBS) 15 and illuminates the liquid crystal panel 16. S-polarized light (image light) into which the P-polarized light is converted by the liquid crystal panel 16 is reflected by the PBS 15, passes through the projection lens 220, and is projected onto a screen (not illustrated).

Figure 2:
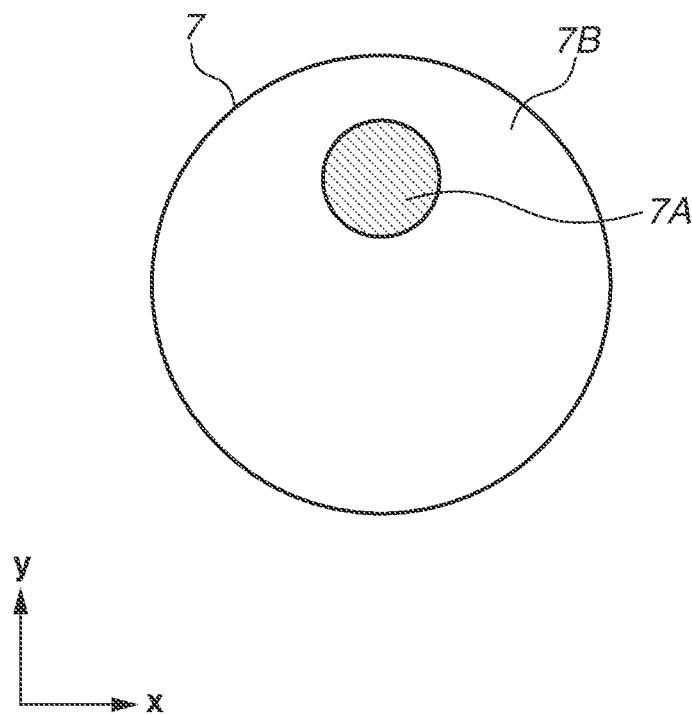
FIG. 2 is a diagram illustrating a configuration of a second collimator lens according to the first exemplary embodiment of the disclosure.

While a configuration for extracting the fluorescent light from the phosphor unit 6 has been described, white light including the blue light and the fluorescent light can be extracted by the phosphor unit 6 diffusely reflecting a part of the blue light emitted from the LD unit 1. In this case, the reflecting unit (the second reflecting unit) formed on the second collimator lens 7 includes at least a first region 7A and a second region 7B. The reflecting unit is placed between the phosphor unit 6 and the surface on the exit side of a lens placed the furthest on the exit side of the optical system (the second collimator lens 7 in the present exemplary embodiment). FIG. 2 illustrates the configuration of the surface on the phosphor side of the reflecting unit formed on the second collimator lens 7. The first region 7A is a region on which a dichroic film having the property of reflecting the blue light and transmitting the fluorescent light is vapor-deposited. The second region 7B is a region on which an antireflection film having the property of transmitting visible light including at least the blue light and the fluorescent light is vapor-deposited. The blue light diffusely reflected by the phosphor unit 6 passes through the second region 7B and is incident on the illumination optical system 210.

The LD unit 1 may be a light source that emits ultraviolet light, and the phosphor unit 6 may be a phosphor that emits white light with the ultraviolet light. In this case, on the surface on the phosphor side of the second collimator lens 7, a dichroic film that reflects the ultraviolet light and transmits the white light is vapor-deposited.

The micro fly's-eye lens 2 may be a computer-generated hologram (CGH) or a diffusion plate.

In the image projection apparatus according to the present exemplary embodiment, a reflective liquid crystal panel is used. Alternatively, a transmissive liquid crystal panel or a micro mirror device may be used.

Another configuration of the image projection apparatus is described below. The dichroic mirror 3 separates light into reflection and transmission according to the angle of incidence and therefore is referred to as an "angle separation surface".

The first angle of incidence at which the first light (the principal ray) from the light source is incident on the angle separation surface is $\theta 1$ (°), the second angle of incidence at which the first light (the principal ray) from a first reflecting unit (the concave mirror 4 in the first exemplary embodiment) is incident on the angle separation surface is $\theta 2$ (°), and the main wavelength of the first light is $\lambda$ (nm). If the reflectance of the light with the wavelength $\lambda$ at the angle of incidence $\theta$ is $R(\theta,\lambda)$, in one embodiment, the following inequalities (1) and (2) should be satisfied.

$$0.9 \leq R(\theta 1,\lambda) \leq 1.0 \tag{1}$$

$$0 \leq R(\theta 2,\lambda) \leq 0.1 \tag{2}$$

In another embodiment, the numerical ranges of inequalities (1) and (2) should be the numerical ranges of the following inequalities (3) and (4), respectively.

$$0.95 \leq R(\theta 1,\lambda) \leq 1.0 \tag{3}$$

$$0 \leq R(\theta 2,\lambda) \leq 0.05 \tag{4}$$

In one embodiment, the angle of incidence $\theta$ on the angle separation surface should satisfy the following inequality (5).

$$\theta 2+10<\theta 1<70 \tag{5}$$

In another embodiment, the numerical range of the inequality (5) should be the numerical ranges of the following inequalities (6) and (7).

$$35<\theta 1<55 \tag{6}$$

$$\theta 2+20<\theta 1 \tag{7}$$

In a case where the blue light is extracted by the phosphor unit 6 diffusely reflecting the blue light, and if the area of the first region 7A is A and the area of the second region 7B is B, it is desirable that the following inequality (8) should be satisfied.

$$0.04<A/(A+B)<0.5 \tag{8}$$

If $A/(A+B)$ exceeds the upper limit of inequality (8), the blue light diffusely reflected by the phosphor unit 6 is reflected by the second collimator lens 7, and the loss of the blue light becomes great. Thus, blue light to create white light cannot be secured.

In one embodiment, the numerical range of inequality (8) should be the numerical range of the following inequality (9).

$$0.06<A/(A+B)<0.3 \tag{9}$$

If the focal length of a light collection optical system (a first optical system) including the concave mirror 4 and the first collimator lens 5 is f1 and the focal length of a parallelization optical system (a second optical system) including the first collimator lens 5 and the second collimator lens 7 is f2, in one embodiment, the following inequality (10) should be satisfied.

$$1.1<f1/f2<2.0 \tag{10}$$

The blue light is incident from the periphery of the fluorescent light, and therefore, the stop diameters of the parallelization optical system and the light collection optical system have values close to each other. Thus, if the focal length f1 of the light collection optical system and the focal length f2 of the parallelization optical system are almost the same as each other, the numerical aperture has a great value. The numerical aperture of a general parallelization optical system is 0.9 or more. Thus, the focal length f1 of the light collection optical system is shortened relative to the focal length f2 of the parallelization optical system, whereby the numerical aperture can be made small. This can reduce aberration.

In one embodiment, the numerical range of inequality (10) should be the numerical range of the following inequality (11).

$$1.3 < f1/f2 < 1.6 \tag{11}$$

While an exemplary embodiment has been described in which a dichroic film having the property of reflecting the blue light and transmitting the fluorescent light is vapor-deposited on the second collimator lens 7, the dichroic film and the second collimator lens 7 may be composed of separate members. A dichroic mirror obtained by vapor-depositing a dichroic film on a flat plate may be placed between the first collimator lens 5 and the second collimator lens 7.

As described above, the light source device of the image projection apparatus according to the present exemplary embodiment can be miniaturized by including an optical element that controls transmission and reflection according to the angle of incidence.

Figure 3:
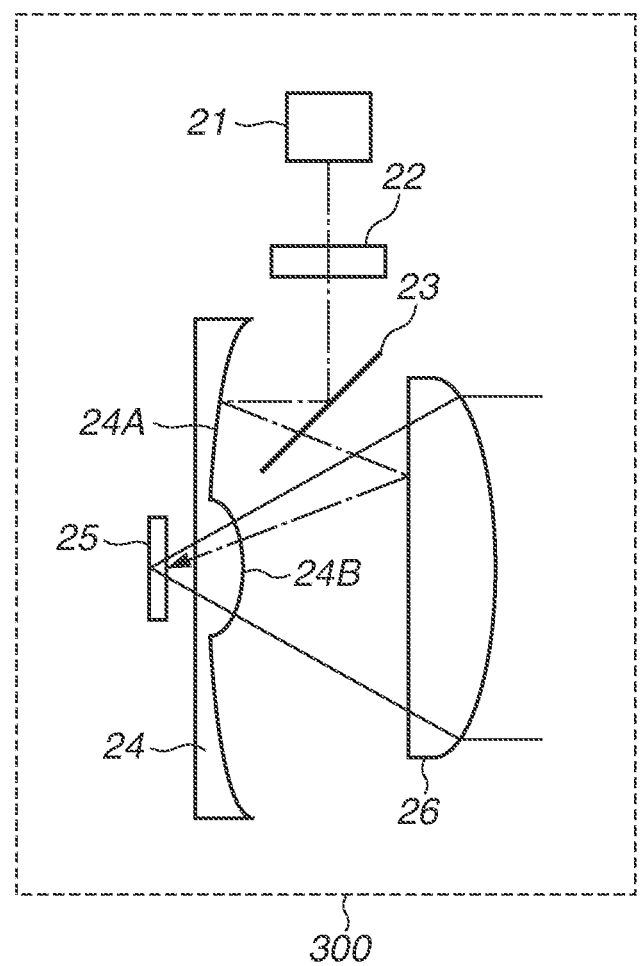
FIG. 3 is a diagram illustrating a configuration of a light source device according to a second exemplary embodiment of the disclosure.

FIG. 3 is a diagram illustrating the configuration of a light source device 300 included in an image projection apparatus according to a second exemplary embodiment. The image projection apparatus according to the present exemplary embodiment includes an illumination optical system and a projection lens having configurations similar to those of the illumination optical system 210 and the projection lens 220 described in the first exemplary embodiment. In the light source device 300, an optical element 24 obtained by integrating the concave mirror 4 and the first collimator lens 5 according to the first exemplary embodiment is placed.

The optical element 24 includes a concave region 24A (a first reflecting unit) and a convex region 24B. On the concave region 24A, a dielectric film or a metal film having the property of reflecting the blue light is vapor-deposited. On the convex region 24B, a dielectric film having the property of transmitting the blue light and the fluorescent light is vapor-deposited.

The blue light emitted from an LD unit 21 (a light source) passes through a micro fly's-eye lens 22, is reflected by a dichroic mirror 23, is reflected by the concave region 24A, passes through the dichroic mirror 23, and is reflected by a second collimator lens 26. The light reflected by the second collimator lens 26 passes through the convex region 24B and is collected on a phosphor unit 25.

The fluorescent light emitted from the phosphor unit 25 (a wavelength conversion unit) is parallelized by the convex region 24B and the second collimator lens 26 and is incident on the illumination optical system 210 (not illustrated).

The dichroic mirror 23 according to the present exemplary embodiment has a feature similar to the feature of the dichroic mirror 3 described in the first exemplary embodiment. Similarly to the second collimator lens 7 according to the first exemplary embodiment, on the second collimator lens 26 according to the present exemplary embodiment, a dichroic film having the property of reflecting the blue light and transmitting the fluorescent light is vapor-deposited.

Figure 4:
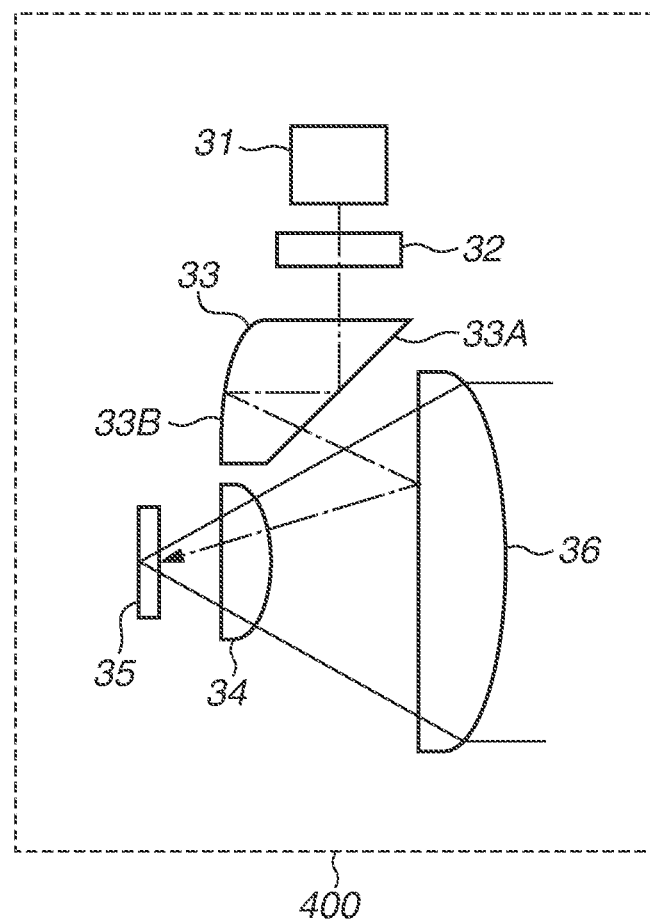
FIG. 4 is a diagram illustrating a configuration of a light source device according to a third exemplary embodiment of the disclosure.

FIG. 4 is a diagram illustrating the configuration of a light source device 400 included in an image projection apparatus according to a third exemplary embodiment. The image projection apparatus according to the present exemplary embodiment includes an illumination optical system and a projection lens having configurations similar to those of the illumination optical system 210 and the projection lens 220 described in the first exemplary embodiment. In the light source device 400, a prism 33 obtained by integrating the concave mirror 4 (the first reflecting unit) and the dichroic mirror 3 (the optical element) according to the first exemplary embodiment is placed.

The prism 33 includes an angle separation surface 33A on which a dichroic film is vapor-deposited, and a concave region 33B. On the concave region 33B, a dielectric film or a metal film having the property of reflecting the blue light is vapor-deposited. On the angle separation surface 33A of the prism 33, a dichroic film having the property of reflecting the blue light at the first angle of incidence and transmitting the blue light at the second angle of incidence is vapor-deposited.

The blue light emitted from an LD unit 31 (a light source) passes through a micro fly's-eye lens 32, is reflected by the angle separation surface 33A of the prism 33, is reflected by the concave region 33B, passes through the angle separation surface 33A, and is reflected by a second collimator lens 36. The light reflected by the second collimator lens 36 passes through a first collimator lens 34 and is collected on a phosphor unit 35.

The fluorescent light emitted from the phosphor unit 35 (a wavelength conversion unit) is parallelized by the first collimator lens 34 and the second collimator lens 36 and is incident on the illumination optical system 210 (not illustrated).

The angle separation surface 33A according to the present exemplary embodiment has a feature similar to the feature of the dichroic mirror 3 described in the first exemplary embodiment. Similarly to the second collimator lens 7 according to the first exemplary embodiment, on the second collimator lens 36 according to the present exemplary embodiment, a dichroic film having the property of reflecting the blue light and transmitting the fluorescent light is vapor-deposited.

Figure 5:
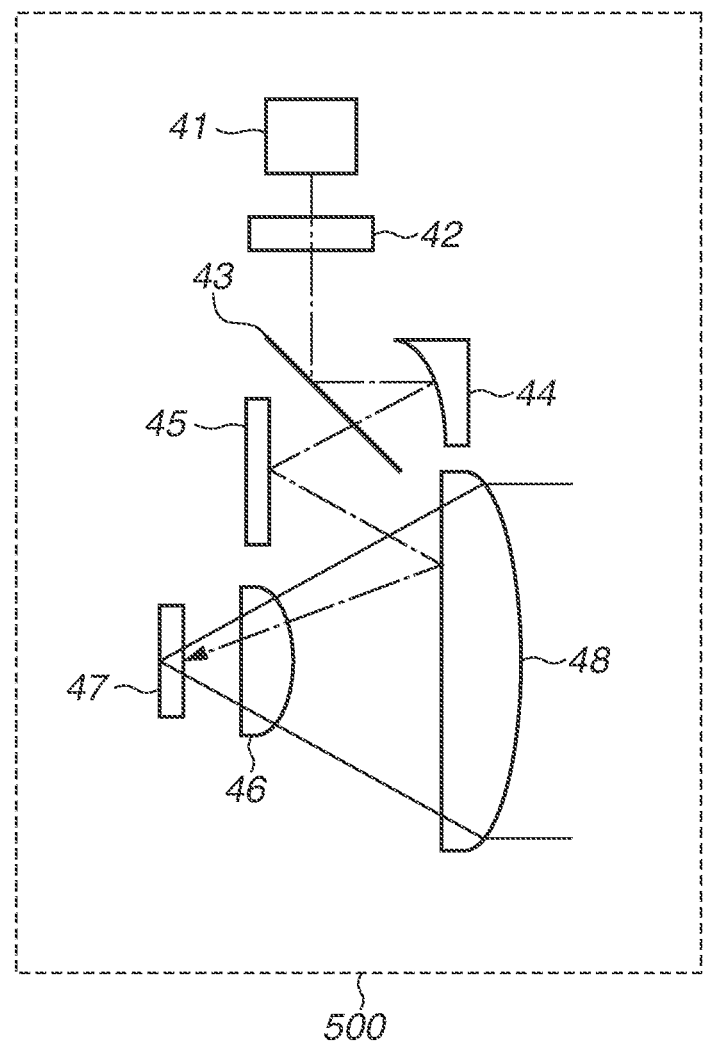
FIG. 5 is a diagram illustrating a configuration of a light source device according to a fourth exemplary embodiment of the disclosure.

FIG. 5 is a diagram illustrating the configuration of a light source device 500 included in an image projection apparatus according to a fourth exemplary embodiment. The image projection apparatus according to the present exemplary embodiment includes an illumination optical system and a projection lens having configurations similar to those of the illumination optical system 210 and the projection lens 220 described in the first exemplary embodiment. In the light source device 500, a reflecting mirror 45 that reflects light (the first light) having passed through a dichroic mirror 43 is placed.

The blue light emitted from an LD unit 41 (a light source) passes through a micro fly's-eye lens 42, is reflected by the dichroic mirror 43, is reflected by a concave mirror 44, and passes through the dichroic mirror 43. The light having passed through the dichroic mirror 43 is reflected by the reflecting mirror 45 and a second collimator lens 48. The light reflected by the second collimator lens 48 passes through a first collimator lens 46 and is collected on a phosphor unit 47.

The fluorescent light emitted from the phosphor unit 47 (a wavelength conversion unit) is parallelized by the first collimator lens 46 and the second collimator lens 48 and is incident on the illumination optical system 210 (not illustrated).

Alternatively, the concave mirror 44 and the second collimator lens 48 may be integrated together. The reflecting mirror 45 and the first collimator lens 46 may be integrated together.

The dichroic mirror 43 according to the present exemplary embodiment has a feature similar to the feature of the dichroic mirror 3 described in the first exemplary embodiment. Similarly to the second collimator lens 7 according to the first exemplary embodiment, on the second collimator lens 48 according to the present exemplary embodiment, a dichroic film having the property of reflecting the blue light and transmitting the fluorescent light is vapor-deposited.

Figure 6:
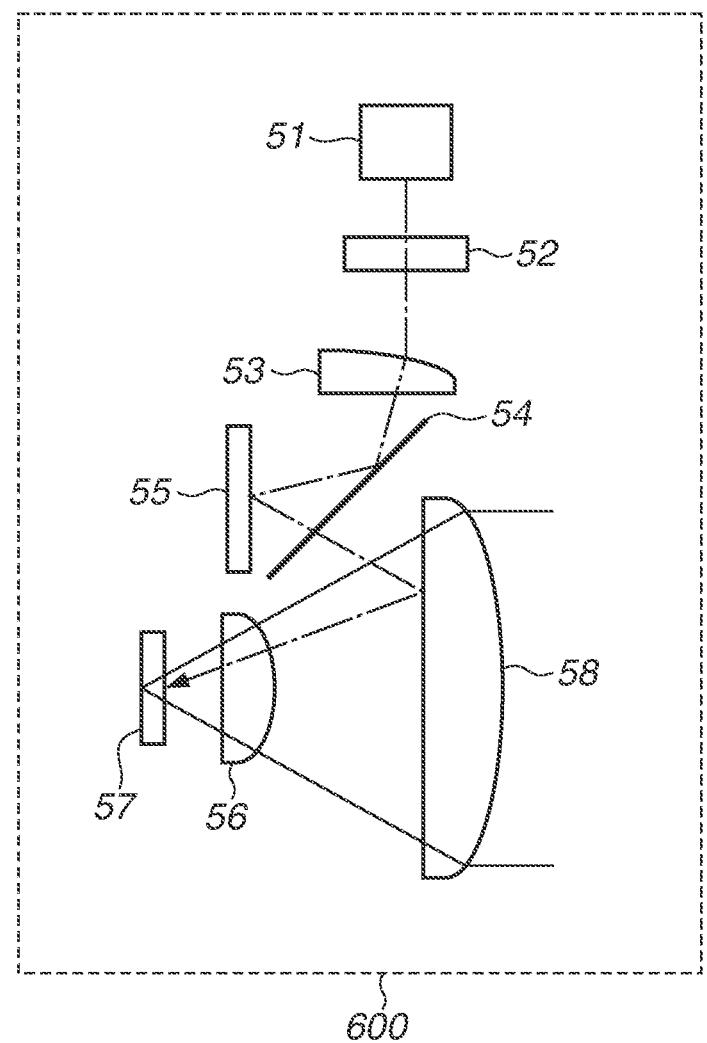
FIG. 6 is a diagram illustrating a configuration of a light source device according to a fifth exemplary embodiment of the disclosure.

FIG. 6 is a diagram illustrating the configuration of a light source device 600 included in an image projection apparatus according to a fifth exemplary embodiment. The image projection apparatus according to the present exemplary embodiment includes an illumination optical system and a projection lens having configurations similar to those of the illumination optical system 210 and the projection lens 220 described in the first exemplary embodiment. In the light source device 600, a convex lens 53 that collects the blue light emitted from an LD unit 51 is placed.

The blue light emitted from the LD unit 51 (a light source) passes through a micro fly's-eye lens 52, passes through the convex lens 53, is reflected by a dichroic mirror 54, is reflected by a reflecting mirror 55, and passes through the dichroic mirror 54. The light having passed through the dichroic mirror 54 is reflected by a second collimator lens 58. The light reflected by the second collimator lens 58 passes through a first collimator lens 56 and is collected on a phosphor unit 57.

The fluorescent light emitted from the phosphor unit 57 (a wavelength conversion unit) is parallelized by the first collimator lens 56 and the second collimator lens 58 and is incident on the illumination optical system 210 (not illustrated).

The dichroic mirror 43 according to the present exemplary embodiment has a feature similar to the feature of the dichroic mirror 3 described in the first exemplary embodiment. Similarly to the second collimator lens 7 according to the first exemplary embodiment, on the second collimator lens 58 according to the present exemplary embodiment, a dichroic film having the property of reflecting the blue light and transmitting the fluorescent light is vapor-deposited.

Figure 7:
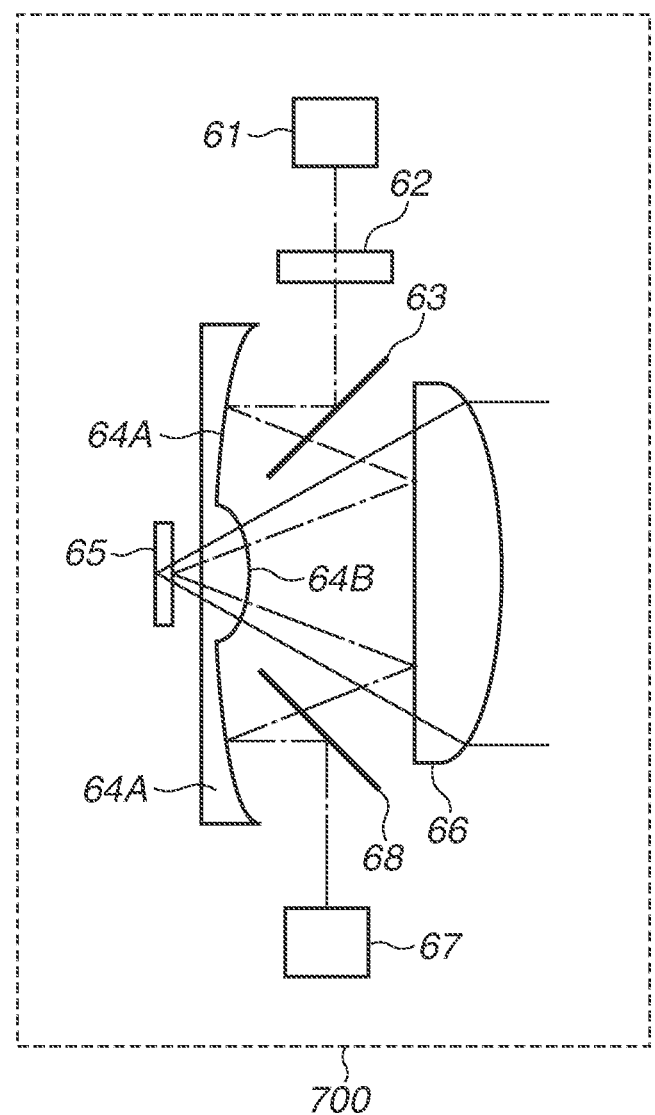
FIG. 7 is a diagram illustrating a configuration of a light source device according to a sixth exemplary embodiment of the disclosure.

FIG. 7 is a diagram illustrating the configuration of a light source device 700 included in an image projection apparatus according to a sixth exemplary embodiment. The image projection apparatus according to the present exemplary embodiment includes an illumination optical system and a projection lens having configurations similar to those of the illumination optical system 210 and the projection lens 220 described in the first exemplary embodiment. The light source device 700 has a configuration in which an auxiliary LD unit 67 (an auxiliary light source) is placed in the light source device according to the second exemplary embodiment. The auxiliary LD unit 67 includes a plurality of red LDs and a plurality of collimator lenses and emits red light (third light). The red LDs of the auxiliary LD unit 67 may be red LEDs. In a case where infrared light is projected, infrared LDs or infrared LEDs may be placed in the auxiliary LD unit 67.

The red light emitted from the auxiliary LD unit 67 is reflected by a dichroic mirror 68, is reflected by a concave region 64A, passes through the dichroic mirror 68, and is reflected by a second collimator lens 66. The light reflected by the second collimator lens 66 passes through a convex region 64B and is collected on a phosphor unit 65. The red light diffused by the phosphor unit 65 is parallelized by the convex region 64B and the second collimator lens 66 and is incident on the illumination optical system 210 (not illustrated).

The blue light emitted from an LD unit 61 (a light source) passes through a micro fly's-eye lens 62, is reflected by a dichroic mirror 63, is reflected by the concave region 64A, passes through the dichroic mirror 63, and is reflected by the second collimator lens 66. The light reflected by the second collimator lens 66 passes through the convex region 64B and is collected on the phosphor unit 65.

The fluorescent light emitted from the phosphor unit 65 (a wavelength conversion unit) is parallelized by the convex region 64B and the second collimator lens 66 and is incident on the illumination optical system 210 (not illustrated).

Blue LDs may be employed in the auxiliary LD unit 67, light may be collected on the phosphor unit 65 by the same principle as that of the second exemplary embodiment, and the fluorescent light may be extracted from the phosphor unit 65.

The dichroic mirror 63 according to the present exemplary embodiment has a feature similar to the feature of the dichroic mirror 3 described in the first exemplary embodiment. Similarly to the second collimator lens 7 according to the first exemplary embodiment, on the second collimator lens 66 according to the present exemplary embodiment, a dichroic film having the property of reflecting the blue light and transmitting the fluorescent light is vapor-deposited.

While the exemplary embodiments of the disclosure have been described above, the disclosure is not limited to these exemplary embodiments, the exemplary embodiments of the disclosure can be combined, modified, and changed in various ways within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-186026, filed Nov. 6, 2020, which is hereby incorporated by reference herein in its entirety.

What is claimed is:

1. A device comprising:
    a light source configured to generate first light;
    an optical element configured to reflect light incident on the optical element at a first angle of incidence and transmit light incident on the optical element at a second angle of incidence smaller than the first angle of incidence;
    a first reflecting unit;
    a second reflecting unit; and
    a conversion unit on which the first light is incident and which is configured to emit second light,
    wherein the first light is reflected by the first reflecting unit, passes through the optical element, and is then incident on the second reflecting unit, and
    wherein the second reflecting unit reflects the first light to the conversion unit.

2. The device according to claim 1, further comprising a first lens configured to collect the first light reflected by the second reflecting unit on the conversion unit.

3. The device according to claim 2, further comprising a second lens through which the second light emitted from the conversion unit passes.

4. The device according to claim 3, wherein the second reflecting unit is placed between the conversion unit and the second lens.

5. The device according to claim 4,
wherein the second reflecting unit is placed between the first and second lenses,
wherein the first light is reflected by the second reflecting unit, passes through the first lens, and is incident on the conversion unit, and
wherein the second light passes through the first lens, passes through the second reflecting unit, and passes through the second lens.

6. The device according to claim 5, wherein the first reflecting unit and the first lens are included in a first optical system configured to collect the first light from the light source on the conversion unit.

7. The device according to claim 6, wherein the first and second lenses are included in a second optical system configured to parallelize the second light from the conversion unit.

8. The device according to claim 7, wherein an inequality $1.1 < f1/f2 < 2.0$ is satisfied where a focal length of the first optical system is f1 and a focal length of the second optical system is f2.

9. The device according to claim 1, wherein the first reflecting unit is composed of a concave mirror.

10. The device according to claim 1, wherein the second reflecting unit reflects the first light and transmits the second light.

11. The device according to claim 1, wherein the second reflecting unit includes a first region having a property of reflecting the first light, and a second region having a property of transmitting the first light and the second light.

12. The device according to claim 11, wherein an inequality $0.04 < A/(A+B) < 0.5$ is satisfied where an area of the first region of the second reflecting unit is A and an area of the second region of the second reflecting unit is B.

13. The device according to claim 1, wherein inequalities $0.9 \leq R(\theta1,\lambda) \leq 1.0$ and $0 \leq R(\theta2,\lambda) \leq 0.1$ are satisfied where the first angle of incidence at which the first light is incident on the optical element is $\theta1$ (°), the second angle of incidence at which the first light reflected by the first reflecting unit is incident on the optical element is $\theta2$ (°), a wavelength of the first light is $\lambda$ (nm), and a reflectance of the light of the wavelength $\lambda$ at the angle of incidence $\theta$ on the optical element is $R(\theta,\lambda)$.

14. The device according to claim 1, wherein an inequality $\theta2+10 < \theta1 < 70$ is satisfied where the first angle of incidence at which the first light is incident on the optical element is $\theta1$ (°) and the second angle of incidence at which the first light reflected by the first reflecting unit is incident on the optical element is $\theta2$ (°).

15. An apparatus comprising a device and a system that guides light from the device to a display element,
the device comprising:
a light source configured to generate first light;
an optical element configured to reflect light incident on the optical element at a first angle of incidence and transmit light incident on the optical element at a second angle of incidence smaller than the first angle of incidence;
a first reflecting unit;
a second reflecting unit; and
a conversion unit on which the first light is incident and which is configured to emit second light,
wherein the first light is reflected by the first reflecting unit, passes through the optical element, and is then incident on the second reflecting unit, and
wherein the second reflecting unit reflects the first light to the conversion unit.

16. The apparatus according to claim 15, wherein the device further comprises a first lens configured to collect the first light reflected by the second reflecting unit on the conversion unit.

17. The apparatus according to claim 15,
wherein the first reflecting unit is composed of a concave mirror, and
wherein the second reflecting unit reflects the first light and transmits the second light.

18. The apparatus according to claim 15, wherein the second reflecting unit includes a first region having a property of reflecting the first light, and a second region having a property of transmitting the first light and the second light.

19. The apparatus according to claim 15, wherein inequalities $0.9 \leq R(\theta1,\lambda) \leq 1.0$ and $0 \leq R(\theta2,\lambda) \leq 0.1$ are satisfied where the first angle of incidence at which the first light is incident on the optical element is $\theta1$ (°), the second angle of incidence at which the first light reflected by the first reflecting unit is incident on the optical element is $\theta2$ (°), a wavelength of the first light is $\lambda$ (nm), and a reflectance of the light of the wavelength $\lambda$ at the angle of incidence $\theta$ on the optical element is $R(\theta,\lambda)$.

20. The apparatus according to claim 15, wherein an inequality $\theta2+10 < \theta1 < 70$ is satisfied where the first angle of incidence at which the first light is incident on the optical element is $\theta1$ (°) and the second angle of incidence at which the first light reflected by the first reflecting unit is incident on the optical element is $\theta2$ (°).

* * * * *